US010028294B2

(12) United States Patent
Yi et al.

(10) Patent No.: US 10,028,294 B2
(45) Date of Patent: Jul. 17, 2018

(54) METHOD FOR NOTIFYING FOR D2D COMMUNICATION SYSTEM AND DEVICE THEREFOR

(71) Applicant: LG ELECTRONICS INC., Seoul (KR)

(72) Inventors: Seungjune Yi, Seoul (KR); Sunyoung Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 7 days.

(21) Appl. No.: 15/110,045

(22) PCT Filed: Jan. 21, 2015

(86) PCT No.: PCT/KR2015/000627
§ 371 (c)(1),
(2) Date: Jul. 6, 2016

(87) PCT Pub. No.: WO2015/115749
PCT Pub. Date: Aug. 6, 2015

(65) Prior Publication Data
US 2016/0338082 A1 Nov. 17, 2016

Related U.S. Application Data

(60) Provisional application No. 61/934,653, filed on Jan. 31, 2014.

(51) Int. Cl.
*H04L 5/00* (2006.01)
*H04W 72/12* (2009.01)
(Continued)

(52) U.S. Cl.
CPC ..... *H04W 72/1215* (2013.01); *H04L 61/6022* (2013.01); *H04L 67/303* (2013.01);
(Continued)

(58) Field of Classification Search
CPC ..... H04W 8/005; H04W 4/005; H04W 4/008; H04B 7/26; H04L 5/00
See application file for complete search history.

(56) References Cited

U.S. PATENT DOCUMENTS 8,867,666 B2 * 10/2014 Kim ............... H04L 5/0007
370/203
2013/0250771 A1 9/2013 Yu et al.
(Continued)

FOREIGN PATENT DOCUMENTS

CN 103037448 A 4/2013
KR 10-1186620 B1 * 9/2012
(Continued)

OTHER PUBLICATIONS

ETSI MCC, "Draft Report of 3GPP TSG RAN WG2 Meeting #84," 3GPP TSG-RAN Working Group 2 Meeting #85, R2-140002, Prague, Czech Republic, Feb. 10-14, 2014, pp. 1-134.
(Continued)

*Primary Examiner* — Mohamed Kamara
(74) *Attorney, Agent, or Firm* — Birch, Stewart, Kolasch & Birch, LLP

(57) ABSTRACT

The present invention relates to a wireless communication system. More specifically, the present invention relates to a method and a device for notifying D2D communication, the method comprising: generating, by a first UE, a first identity (ID) according to a type of D2D (Device to Device) communication; generating, by a first UE, a first indicator indicating that the first UE is trying to perform the type of D2D communication with at least one second UE; and transmitting, by the first UE, a first MAC PDU (Medium Access Control Protocol Data Unit) including the first ID and the first indicator to that at least one second UE.

8 Claims, 16 Drawing Sheets

(51) Int. Cl.

| | | |
|---|---|---|
| *H04W 76/14* | (2018.01) | |
| *H04W 74/00* | (2009.01) | |
| *H04W 8/00* | (2009.01) | |
| *H04L 29/12* | (2006.01) | |
| *H04L 29/08* | (2006.01) | |
| *H04W 92/18* | (2009.01) | |
| *H04W 88/06* | (2009.01) | |
| *H04W 88/16* | (2009.01) | |

(52) U.S. Cl.
CPC ......... *H04W 8/005* (2013.01); *H04W 74/002* (2013.01); *H04W 76/14* (2018.02); *H04W 88/06* (2013.01); *H04W 88/16* (2013.01); *H04W 92/18* (2013.01)

(56) References Cited

U.S. PATENT DOCUMENTS

| | | | | |
|---|---|---|---|---|
| 2014/0204831 | A1* | 7/2014 | Kim | H04L 69/22 370/312 |
| 2015/0305080 | A1* | 10/2015 | Xu | H04W 76/023 370/329 |
| 2016/0219639 | A1* | 7/2016 | Agiwal | H04W 8/005 |
| 2016/0302247 | A1* | 10/2016 | Lu | H04W 8/005 |

FOREIGN PATENT DOCUMENTS

| | | |
|---|---|---|
| RU | 2010109405 A | 9/2011 |
| WO | WO 2013/141483 A1 | 9/2013 |
| WO | WO 2013/155473 A1 | 10/2013 |
| WO | WO 2013/162193 A1 | 10/2013 |
| WO | WO 2013/181515 A2 | 12/2013 |
| WO | WO 2013/191353 A1 | 12/2013 |

OTHER PUBLICATIONS

Fujitsu, "UP Protocol Stack Configuration for D2D Communication," 3GPP TSG RAN WG2 Meeting #85, R2-140221, Prague, Czech Republic, Feb. 10-14, 2014, pp. 1-4.

General Dynamics Broadband UK, "Issues Surrounding the Use of a Connectionless Approach to Providing LTE D2D Communications," 3GPP TSG-RAN2 #83b, R2-133198, Ljubljana, Slovenia, Oct. 7-11, 2013, 7 pages.

Intel Corporation, "MAC PDU Format for D2D 1:M Communication," 3GPP TSG RAN WG2 Meeting #84, R2-134293, San Francisco, USA, Nov. 11-15, 2013, 2 pages.

QUALCOMM Incorporated, "D2D Broadcast Communication for Public Safety," 3GPP TSG-RAN WG2 #83bis, R2-133484, Ljubljana, Slovenia, Oct. 7-11, 2013, pp. 1-8.

* cited by examiner (a) Control-Plane Protocol Stack (b) User-Plane Protocol Stack R/R/E/LCID/F/L sub-header with
7-bits L field R/R/E/LCID/F/L sub-header with
15-bits L field R/R/E/LCID sub-header

METHOD FOR NOTIFYING FOR D2D COMMUNICATION SYSTEM AND DEVICE THEREFOR

CROSS REFERENCE TO RELATED APPLICATIONS

This application is the National Phase of PCT/KR2015/000627 filed on Jan. 21, 2015, which claims priority under 35 U.S.C. § 119(e) to U.S. Provisional Application No. 61/934,653 filed on Jan. 31, 2014, all of which are hereby expressly incorporated by reference into the present application.

TECHNICAL FIELD

The present invention relates to a wireless communication system and, more particularly, to a method for notifying D2D (Device to Device) communication system and a device therefor.

BACKGROUND ART

As an example of a mobile communication system to which the present invention is applicable, a 3rd Generation Partnership Project Long Term Evolution (hereinafter, referred to as LTE) communication system is described in brief.

FIG. 1 is a view schematically illustrating a network structure of an E-UMTS as an exemplary radio communication system. An Evolved Universal Mobile Telecommunications System (E-UMTS) is an advanced version of a conventional Universal Mobile Telecommunications System (UMTS) and basic standardization thereof is currently underway in the 3GPP. E-UMTS may be generally referred to as a Long Term Evolution (LTE) system. For details of the technical specifications of the UMTS and E-UMTS, reference can be made to Release 7 and Release 8 of "3rd Generation Partnership Project; Technical Specification Group Radio Access Network".

Referring to FIG. 1, the E-UMTS includes a User Equipment (UE), eNode Bs (eNBs), and an Access Gateway (AG) which is located at an end of the network (E-UTRAN) and connected to an external network. The eNBs may simultaneously transmit multiple data streams for a broadcast service, a multicast service, and/or a unicast service.

One or more cells may exist per eNB. The cell is set to operate in one of bandwidths such as 1.25, 2.5, 5, 10, 15, and 20 MHz and provides a downlink (DL) or uplink (UL) transmission service to a plurality of UEs in the bandwidth. Different cells may be set to provide different bandwidths. The eNB controls data transmission or reception to and from a plurality of UEs. The eNB transmits DL scheduling information of DL data to a corresponding UE so as to inform the UE of a time/frequency domain in which the DL data is supposed to be transmitted, coding, a data size, and hybrid automatic repeat and request (HARQ)-related information. In addition, the eNB transmits UL scheduling information of UL data to a corresponding UE so as to inform the UE of a time/frequency domain which may be used by the UE, coding, a data size, and HARQ-related information. An interface for transmitting user traffic or control traffic may be used between eNBs. A core network (CN) may include the AG and a network node or the like for user registration of UEs. The AG manages the mobility of a UE on a tracking area (TA) basis. One TA includes a plurality of cells.

Device to device (D2D) communication refers to the distributed communication technology that directly transfers traffic between adjacent nodes without using infrastructure such as a base station. In a D2D communication environment, each node such as a portable terminal discovers another user equipment physically adjacent thereto and transmits traffic after setting communication session. In this way, since D2D communication may solve traffic overload by distributing traffic concentrated into the base station, the D2D communication may have received attention as the element technology of the next generation mobile communication technology after 4G. For this reason, the standard institute such as 3GPP or IEEE has proceeded to establish the D2D communication standard on the basis of LTE-A or Wi-Fi, and Qualcomm has developed their own D2D communication technology.

It is expected that the D2D communication contributes to increase throughput of a mobile communication system and create new communication services. Also, the D2D communication may support proximity based social network services or network game services. The problem of link of a user equipment located at a shade zone may be solved by using a D2D link as a relay. In this way, it is expected that the D2D technology will provide new services in various fields.

The D2D communication technologies such as infrared communication, ZigBee, radio frequency identification (RFID) and near field communications (NFC) based on the RFID have been already used. However, since these technologies support communication only of a specific object within a limited distance (about 1 m), it is difficult for the technologies to be regarded as the D2D communication technologies strictly.

Although the D2D communication has been described as above, details of a method for transmitting data from a plurality of D2D user equipments with the same resource have not been suggested.

DISCLOSURE

Technical Problem

An object of the present invention devised to solve the problem lies in a method and device for notifying D2D communication system. The technical problems solved by the present invention are not limited to the above technical problems and those skilled in the art may understand other technical problems from the following description.

Technical Solution

The object of the present invention can be achieved by providing a method for a User Equipment (UE) operating in a wireless communication system, the method comprising: generating, by a first UE, an first identity (ID) according to a type of D2D (Device to Device) communication; generating, by a first UE, a first indicator indicating that the first UE is trying to perform the type of D2D communication with at least one second UE; and transmitting, by the first UE, a first MAC PDU (Medium Access Control Protocol Data Unit) including the first ID and the first indicator to that at least one second UE.

In another aspect of the present invention, provided herein is a UE (User Equipment) for performing random access procedure in a wireless communication system, the UE comprising: an RF (Radio Frequency) module; and a processor configured to control the RF module, wherein the processor is configured to generate an first identity (ID) according to a type of D2D (Device to Device) communication, to generate a first indicator indicating that the first UE is trying to perform the type of D2D communication with at least one second UE, and to transmit a first MAC PDU (Medium Access Control Protocol Data Unit) including the first ID and the first indicator to that at least one second UE.

Meanwhile, in another aspect of the present invention, provided herein is a method for a User Equipment (UE) operating in a wireless communication system, the method comprising: determining, by a first UE, type information and action information for a D2D (Device to Device) communication with at least one second UE, wherein the type information indicates which the D2D communication is an 1 to 1 communication or an 1 to M (M>1) communication, and the action information indicates which the first UE wants to start or stop the D2D communication with the at least one second UE; generating an indicator according to the determination; and transmitting a MAC PDU (Medium Access Control Protocol Data Unit) including an ID of the first UE and the indicator to the at least one second UE.

In another aspect of the present invention, provided herein is a UE (User Equipment) for performing random access procedure in a wireless communication system, the UE comprising: an RF (Radio Frequency) module; and a processor configured to control the RF module, wherein the processor is configured to determine type information and action information for a D2D (Device to Device) communication with at least one second UE, wherein the type information indicates which the D2D communication is an 1 to 1 communication or an 1 to M (M>1) communication, and the action information indicates which the first UE wants to start or stop the D2D communication with the at least one second UE, to generate an indicator according to the determination, to transmit a MAC PDU (Medium Access Control Protocol Data Unit) including an ID of the first UE and the indicator to the at least one second UE.

Preferably, the first MAC PDU further comprises a LCID field indicating the type of D2D communication, wherein the type of D2D communication comprises a 1 to 1 communication, a 1 to M (M>1) communication and a broadcast communication.

Preferably, if the type of D2D communication is a 1 to 1 communication, the first ID is an ID of the first UE.

Preferably, if the type of D2D communication is a 1 to M (M>1) communication, the first ID is an ID that identifies a specific UE group to which the first UE belongs.

Preferably, if the type of D2D communication is a broadcast communication, the first ID is an ID that identifies a specific broadcasting.

Preferably, the first MAC PDU further comprises an ID of the first UE

Preferably, the method further comprises: receiving, from a second UE, a second MAC PDU including a second ID of the second UE and a second indicator indicating that the second UE wants to join a D2D communication with the first UE; and storing the second ID of the second UE to start an 1 to 1 communication with the second UE using a 1-to-1 communication channel.

Preferably, the method further comprises: receiving, from a second UE, a second MAC PDU including a second ID of the second UE and a second indicator indicating that the second UE wants to join a D2D communication with the first UE; and storing the second ID of the second UE to join the second UE identified by the second ID to a specific UE group identified by the first ID.

Preferably, wherein the first UE transmits the ID and the first indicator to the at least one second UE periodically.

It is to be understood that both the foregoing general description and the following detailed description of the present invention are exemplary and explanatory and are intended to provide further explanation of the invention as claimed.

Advantageous Effects

According to the present invention, an indicator and an ID for D2D communication can be efficiently notified in D2D communication system. It will be appreciated by persons skilled in the art that that the effects achieved by the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention.

BEST MODEL

Universal mobile telecommunications system (UMTS) is a 3rd Generation (3G) asynchronous mobile communication system operating in wideband code division multiple access (WCDMA) based on European systems, global system for mobile communications (GSM) and general packet radio services (GPRS). The long-term evolution (LTE) of UMTS is under discussion by the 3rd generation partnership project (3GPP) that standardized UMTS.

The 3GPP LTE is a technology for enabling high-speed packet communications. Many schemes have been proposed for the LTE objective including those that aim to reduce user and provider costs, improve service quality, and expand and improve coverage and system capacity. The 3G LTE requires reduced cost per bit, increased service availability, flexible use of a frequency band, a simple structure, an open interface, and adequate power consumption of a terminal as an upper-level requirement.

Hereinafter, structures, operations, and other features of the present invention will be readily understood from the embodiments of the present invention, examples of which are illustrated in the accompanying drawings. Embodiments described later are examples in which technical features of the present invention are applied to a 3GPP system.

Although the embodiments of the present invention are described using a long term evolution (LTE) system and a LTE-advanced (LTE-A) system in the present specification, they are purely exemplary. Therefore, the embodiments of the present invention are applicable to any other communication system corresponding to the above definition. In addition, although the embodiments of the present invention are described based on a frequency division duplex (FDD) scheme in the present specification, the embodiments of the present invention may be easily modified and applied to a half-duplex FDD (H-FDD) scheme or a time division duplex (TDD) scheme.

Figure 1:
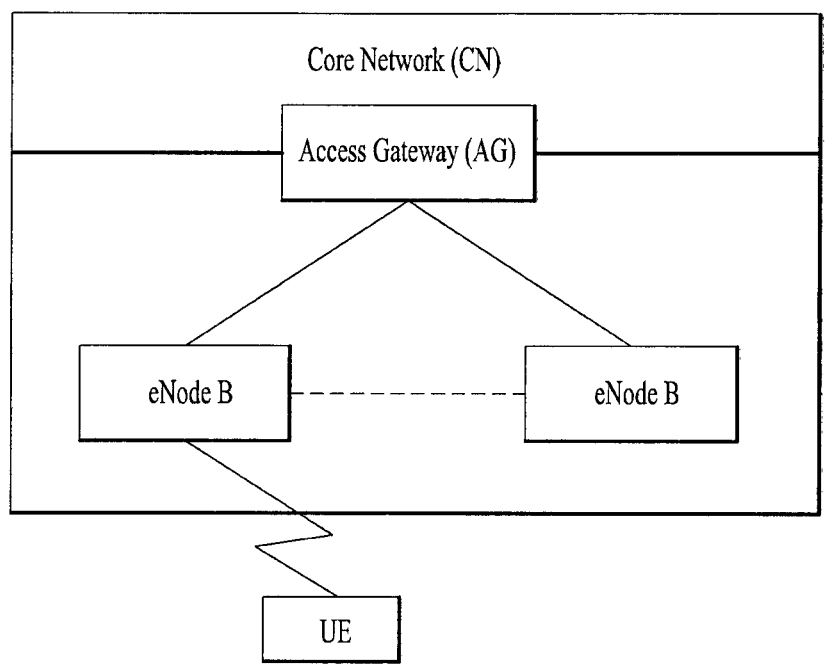
FIG. 1 is a diagram showing a network structure of an Evolved Universal Mobile Telecommunications System (E-UMTS) as an example of a wireless communication system.
Figure 2A:
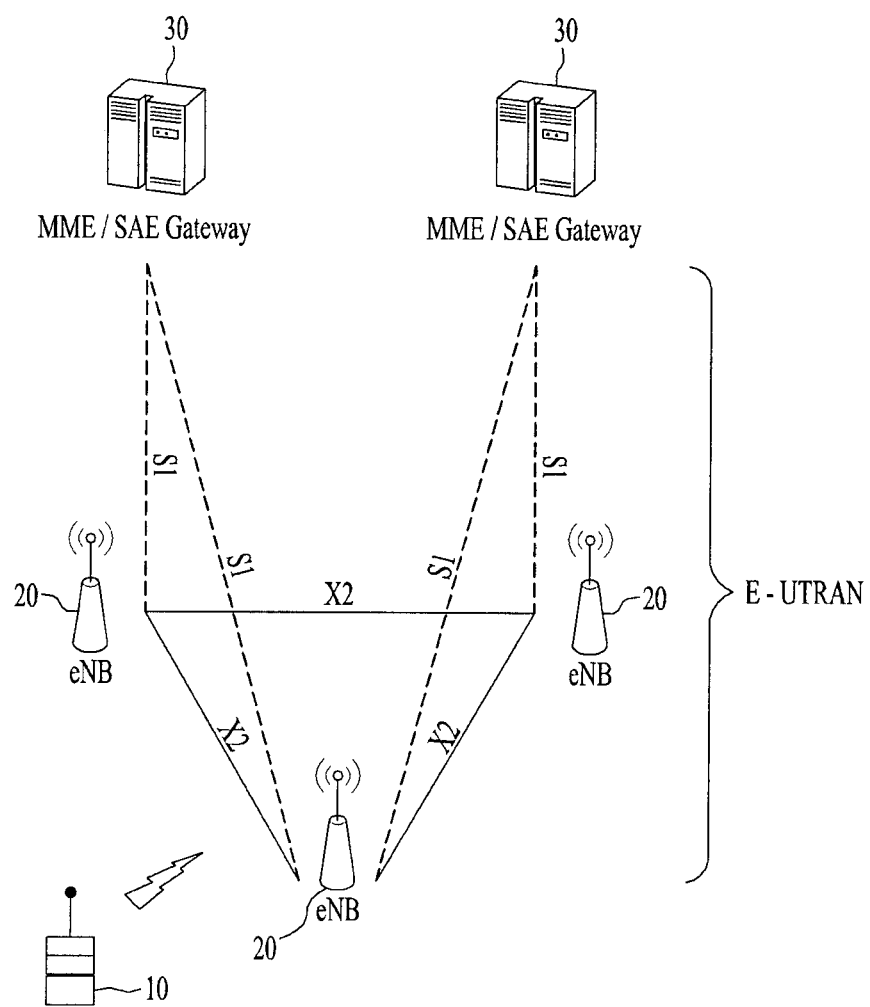
FIG. 2A is a block diagram illustrating network structure of an evolved universal mobile telecommunication system (E-UMTS)

FIG. 2A is a block diagram illustrating network structure of an evolved universal mobile telecommunication system (E-UMTS). The E-UMTS may be also referred to as an LTE system. The communication network is widely deployed to provide a variety of communication services such as voice (VoIP) through IMS and packet data.

As illustrated in FIG. 2A, the E-UMTS network includes an evolved UMTS terrestrial radio access network (E-UTRAN), an Evolved Packet Core (EPC) and one or more user equipment. The E-UTRAN may include one or more evolved NodeB (eNodeB) 20, and a plurality of user equipment (UE) 10 may be located in one cell. One or more E-UTRAN mobility management entity (MME)/system architecture evolution (SAE) gateways 30 may be positioned at the end of the network and connected to an external network.

As used herein, "downlink" refers to communication from eNodeB 20 to UE 10, and "uplink" refers to communication from the UE to an eNodeB. UE 10 refers to communication equipment carried by a user and may be also referred to as a mobile station (MS), a user terminal (UT), a subscriber station (SS) or a wireless device.

Figure 2B:
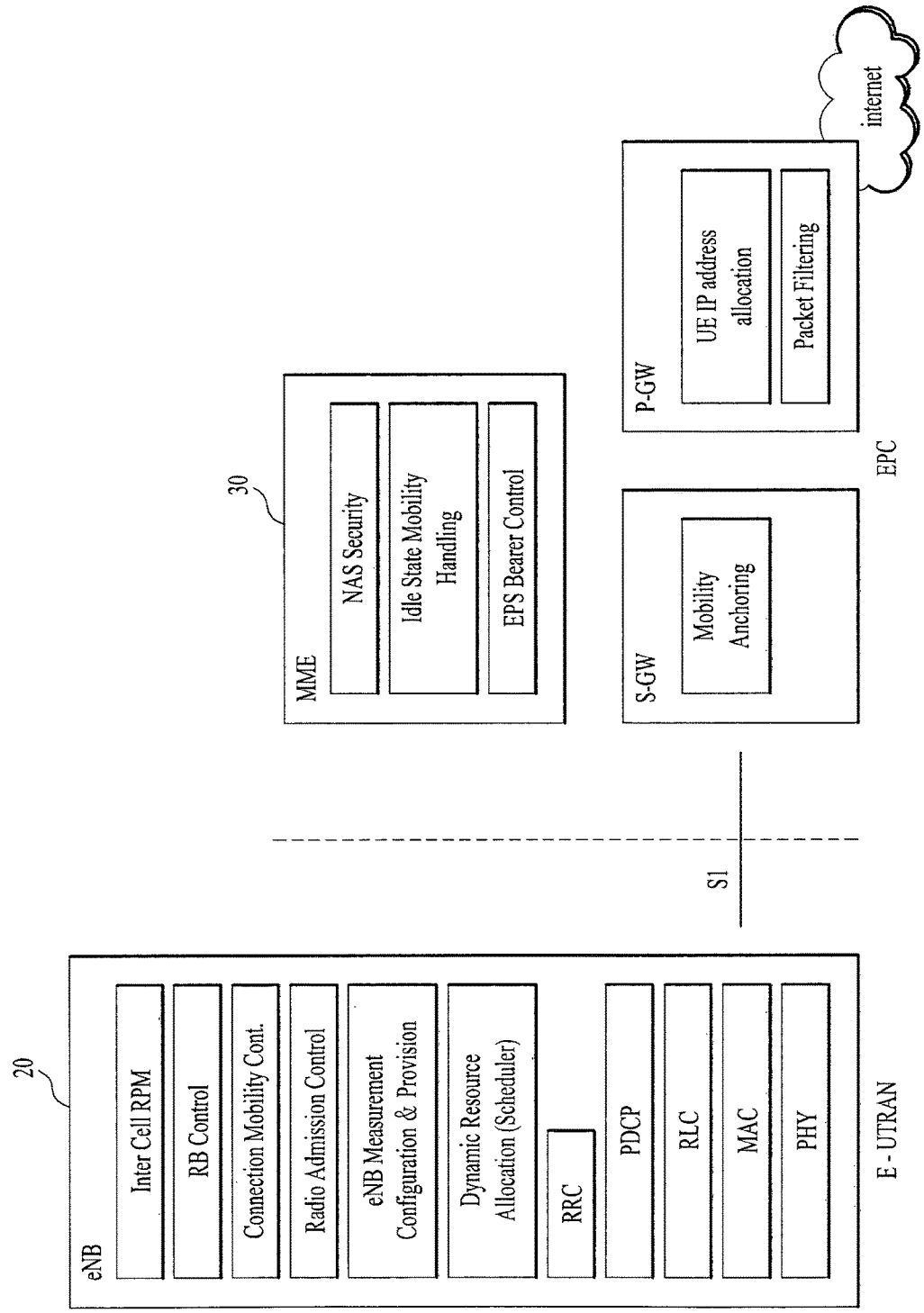
FIG. 2B is a block diagram depicting architecture of a typical E-UTRAN and a typical EPC.

FIG. 2B is a block diagram depicting architecture of a typical E-UTRAN and a typical EPC.

As illustrated in FIG. 2B, an eNodeB 20 provides end points of a user plane and a control plane to the UE 10. MME/SAE gateway 30 provides an end point of a session and mobility management function for UE 10. The eNodeB and MME/SAE gateway may be connected via an S1 interface.

The eNodeB 20 is generally a fixed station that communicates with a UE 10, and may also be referred to as a base station (BS) or an access point. One eNodeB 20 may be deployed per cell. An interface for transmitting user traffic or control traffic may be used between eNodeBs 20.

The MME provides various functions including NAS signaling to eNodeBs 20, NAS signaling security, AS Security control, Inter CN node signaling for mobility between 3GPP access networks, Idle mode UE Reachability (including control and execution of paging retransmission), Tracking Area list management (for UE in idle and active mode), PDN GW and Serving GW selection, MME selection for handovers with MME change, SGSN selection for handovers to 2G or 3G 3GPP access networks, Roaming, Authentication, Bearer management functions including dedicated bearer establishment, Support for PWS (which includes ETWS and CMAS) message transmission. The SAE gateway host provides assorted functions including Per-user based packet filtering (by e.g. deep packet inspection), Lawful Interception, UE IP address allocation, Transport level packet marking in the downlink, UL and DL service level charging, gating and rate enforcement, DL rate enforcement based on APN-AMBR. For clarity MME/SAE gateway 30 will be referred to herein simply as a "gateway," but it is understood that this entity includes both an MME and an SAE gateway.

A plurality of nodes may be connected between eNodeB 20 and gateway 30 via the S1 interface. The eNodeBs 20 may be connected to each other via an X2 interface and neighboring eNodeBs may have a meshed network structure that has the X2 interface.

As illustrated, eNodeB 20 may perform functions of selection for gateway 30, routing toward the gateway during a Radio Resource Control (RRC) activation, scheduling and transmitting of paging messages, scheduling and transmitting of Broadcast Channel (BCCH) information, dynamic allocation of resources to UEs 10 in both uplink and downlink, configuration and provisioning of eNodeB measurements, radio bearer control, radio admission control (RAC), and connection mobility control in LTE_ACTIVE state. In the EPC, and as noted above, gateway 30 may perform functions of paging origination, LTE-IDLE state management, ciphering of the user plane, System Architecture Evolution (SAE) bearer control, and ciphering and integrity protection of Non-Access Stratum (NAS) signaling.

The EPC includes a mobility management entity (MME), a serving-gateway (S-GW), and a packet data network-gateway (PDN-GW). The MME has information about connections and capabilities of UEs, mainly for use in managing the mobility of the UEs. The S-GW is a gateway having the E-UTRAN as an end point, and the PDN-GW is a gateway having a packet data network (PDN) as an end point.

Figure 3:
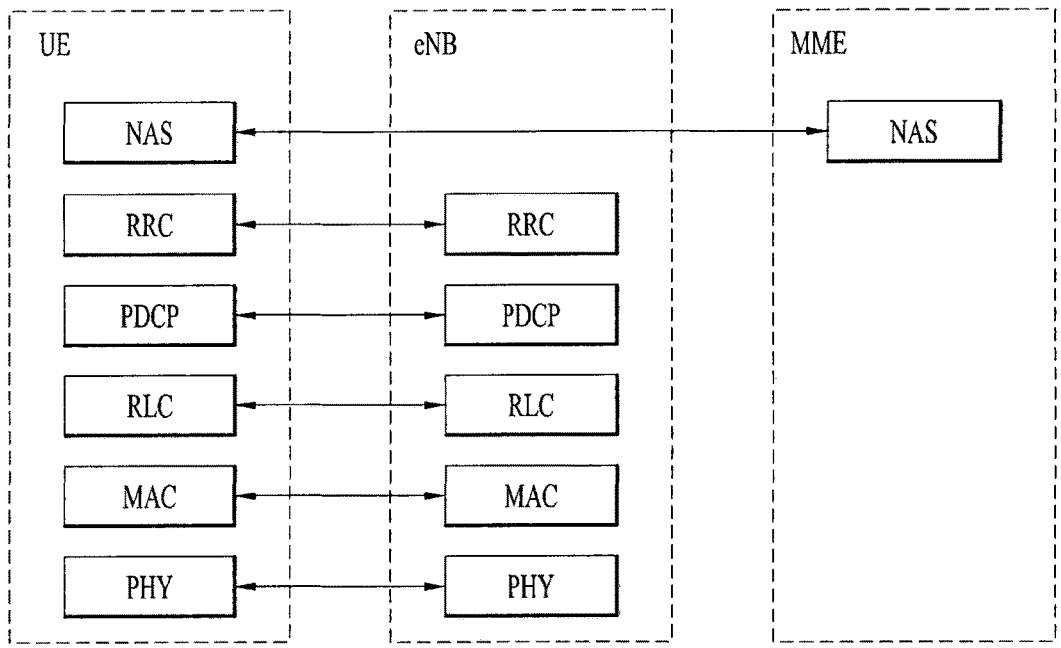
FIG. 3 is a diagram showing a control plane and a user plane of a radio interface protocol between a UE and an E-UTRAN based on a 3rd generation partnership project (3GPP) radio access network standard.
Figure 3:
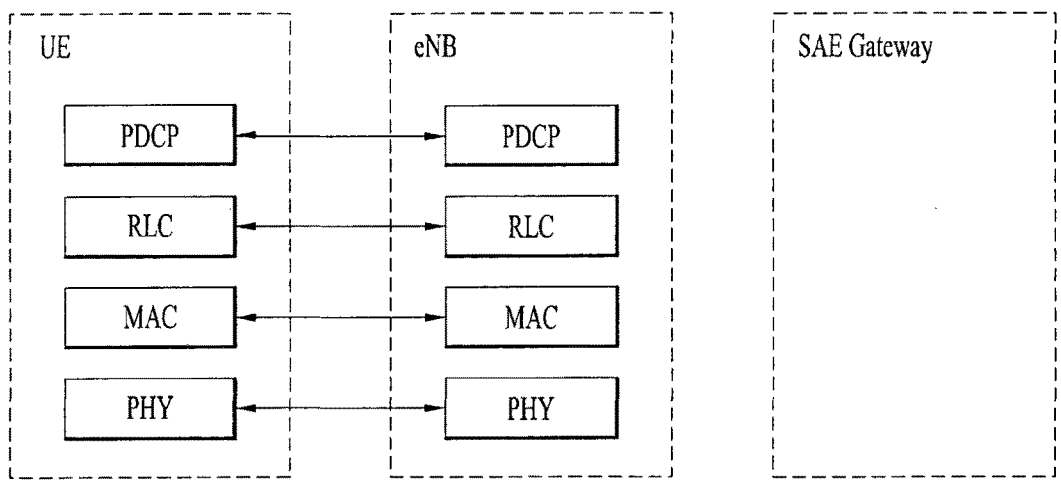

FIG. 3 is a diagram showing a control plane and a user plane of a radio interface protocol between a UE and an E-UTRAN based on a 3GPP radio access network standard. The control plane refers to a path used for transmitting control messages used for managing a call between the UE and the E-UTRAN. The user plane refers to a path used for transmitting data generated in an application layer, e.g., voice data or Internet packet data.

A physical (PHY) layer of a first layer provides an information transfer service to a higher layer using a physical channel. The PHY layer is connected to a medium access control (MAC) layer located on the higher layer via a transport channel. Data is transported between the MAC layer and the PHY layer via the transport channel. Data is transported between a physical layer of a transmitting side and a physical layer of a receiving side via physical channels. The physical channels use time and frequency as radio resources. In detail, the physical channel is modulated using an orthogonal frequency division multiple access (OFDMA) scheme in downlink and is modulated using a single carrier frequency division multiple access (SC-FDMA) scheme in uplink.

The MAC layer of a second layer provides a service to a radio link control (RLC) layer of a higher layer via a logical channel. The RLC layer of the second layer supports reliable data transmission. A function of the RLC layer may be implemented by a functional block of the MAC layer. A packet data convergence protocol (PDCP) layer of the second layer performs a header compression function to reduce unnecessary control information for efficient transmission of an Internet protocol (IP) packet such as an IP version 4 (IPv4) packet or an IP version 6 (IPv6) packet in a radio interface having a relatively small bandwidth.

A radio resource control (RRC) layer located at the bottom of a third layer is defined only in the control plane. The RRC layer controls logical channels, transport channels, and physical channels in relation to configuration, re-configuration, and release of radio bearers (RBs). An RB refers to a service that the second layer provides for data transmission between the UE and the E-UTRAN. To this end, the RRC layer of the UE and the RRC layer of the E-UTRAN exchange RRC messages with each other.

One cell of the eNB is set to operate in one of bandwidths such as 1.25, 2.5, 5, 10, 15, and 20 MHz and provides a downlink or uplink transmission service to a plurality of UEs in the bandwidth. Different cells may be set to provide different bandwidths.

Downlink transport channels for transmission of data from the E-UTRAN to the UE include a broadcast channel (BCH) for transmission of system information, a paging channel (PCH) for transmission of paging messages, and a downlink shared channel (SCH) for transmission of user traffic or control messages. Traffic or control messages of a downlink multicast or broadcast service may be transmitted through the downlink SCH and may also be transmitted through a separate downlink multicast channel (MCH).

Uplink transport channels for transmission of data from the UE to the E-UTRAN include a random access channel (RACH) for transmission of initial control messages and an uplink SCH for transmission of user traffic or control messages. Logical channels that are defined above the transport channels and mapped to the transport channels include a broadcast control channel (BCCH), a paging control channel (PCCH), a common control channel (CCCH), a multicast control channel (MCCH), and a multicast traffic channel (MTCH).

Figure 4:
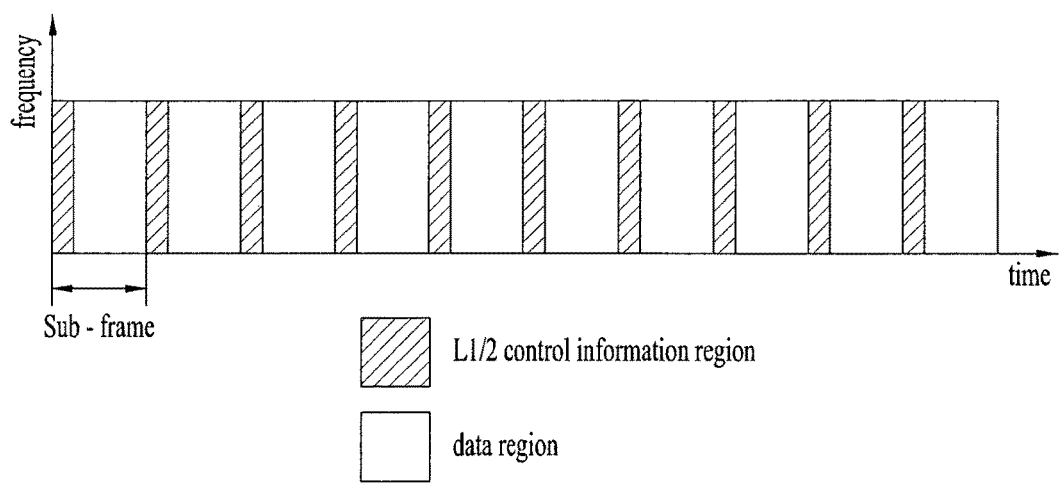
FIG. 4 is a diagram of an example physical channel structure used in an E-UMTS system.

FIG. 4 is a view showing an example of a physical channel structure used in an E-UMTS system. A physical channel includes several subframes on a time axis and several subcarriers on a frequency axis. Here, one subframe includes a plurality of symbols on the time axis. One subframe includes a plurality of resource blocks and one resource block includes a plurality of symbols and a plurality of subcarriers. In addition, each subframe may use certain subcarriers of certain symbols (e.g., a first symbol) of a subframe for a physical downlink control channel (PDCCH), that is, an L1/L2 control channel. In FIG. 4, an L1/L2 control information transmission area (PDCCH) and a data area (PDSCH) are shown. In one embodiment, a radio frame of 10 ms is used and one radio frame includes 10 subframes. In addition, one subframe includes two consecutive slots. The length of one slot may be 0.5 ms. In addition, one subframe includes a plurality of OFDM symbols and a portion (e.g., a first symbol) of the plurality of OFDM symbols may be used for transmitting the L1/L2 control information. A transmission time interval (TTI) which is a unit time for transmitting data is 1 ms.

A base station and a UE mostly transmit/receive data via a PDSCH, which is a physical channel, using a DL-SCH which is a transmission channel, except a certain control signal or certain service data. Information indicating to which UE (one or a plurality of UEs) PDSCH data is transmitted and how the UE receive and decode PDSCH data is transmitted in a state of being included in the PDCCH.

For example, in one embodiment, a certain PDCCH is CRC-masked with a radio network temporary identity (RNTI) "A" and information about data is transmitted using a radio resource "B" (e.g., a frequency location) and transmission format information "C" (e.g., a transmission block size, modulation, coding information or the like) via a certain subframe. Then, one or more UEs located in a cell monitor the PDCCH using its RNTI information. And, a specific UE with RNTI "A" reads the PDCCH and then receive the PDSCH indicated by B and C in the PDCCH information.

Figure 5:
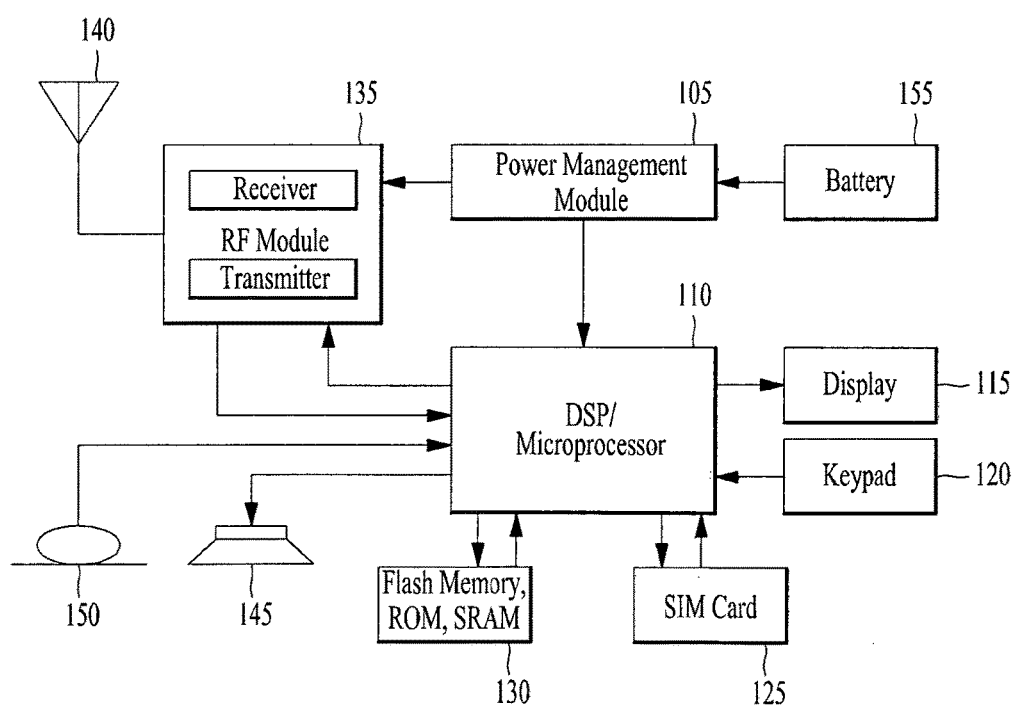
FIG. 5 is a block diagram of a communication apparatus according to an embodiment of the present invention.

FIG. 5 is a block diagram of a communication apparatus according to an embodiment of the present invention.

The apparatus shown in FIG. 5 can be a user equipment (UE) and/or eNB adapted to perform the above mechanism, but it can be any apparatus for performing the same operation.

As shown in FIG. 5, the apparatus may comprises a DSP/microprocessor (110) and RF module (transceiver; 135). The DSP/microprocessor (110) is electrically connected with the transceiver (135) and controls it. The apparatus may further include power management module (105), battery (155), display (115), keypad (120), SIM card (125), memory device (130), speaker (145) and input device (150), based on its implementation and designer's choice.

Specifically, FIG. 5 may represent a UE comprising a receiver (135) configured to receive a request message from a network, and a transmitter (135) configured to transmit the transmission or reception timing information to the network. These receiver and the transmitter can constitute the transceiver (135). The UE further comprises a processor (110) connected to the transceiver (135: receiver and transmitter).

Also, FIG. 5 may represent a network apparatus comprising a transmitter (135) configured to transmit a request message to a UE and a receiver (135) configured to receive the transmission or reception timing information from the UE. These transmitter and receiver may constitute the transceiver (135). The network further comprises a processor (110) connected to the transmitter and the receiver. This processor (110) may be configured to calculate latency based on the transmission or reception timing information.

Recently, Proximity-based Service (ProSe) has been discussed in 3GPP. The ProSe enables different UEs to be connected (directly) each other (after appropriate procedure(s), such as authentication), through eNB only (but not further through Serving Gateway (SGW)/Packet Data Network Gateway (PDN-GW, PGW)), or through SGW/PGW. Thus, using the ProSe, device to device direct communication can be provided, and it is expected that every devices will be connected with ubiquitous connectivity. Direct communication between devices in a near distance can lessen the load of network. Recently, proximity-based social network services have come to public attention, and new kinds of proximity-based applications can be emerged and may create new business market and revenue. For the first step, public safety and critical communication are required in the market. Group communication is also one of key components in the public safety system. Required functionalities are: Discovery based on proximity, Direct path communication, and Management of group communications.

Use cases and scenarios are for example: i) Commercial/social use, ii) Network offloading, iii) Public Safety, iv) Integration of current infrastructure services, to assure the consistency of the user experience including reachability and mobility aspects, and v) Public Safety, in case of absence of EUTRAN coverage (subject to regional regulation and operator policy, and limited to specific public-safety designated frequency bands and terminals)

Figure 6:
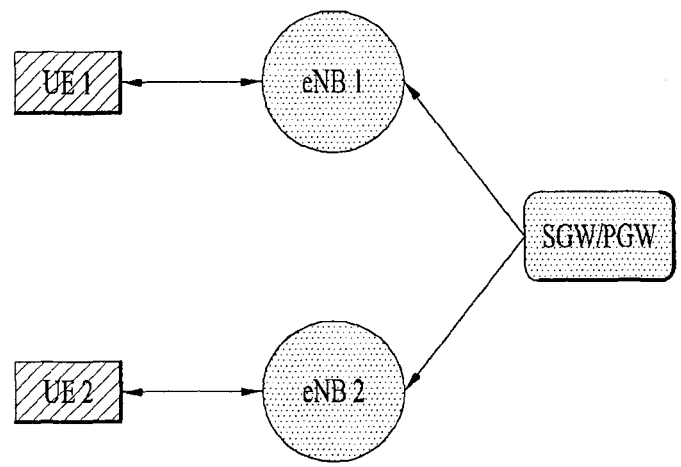
FIG. 6 is an example of default data path for a normal communication.

FIG. 6 is an example of default data path for communication between two UEs. With reference to FIG. 6, even when two UEs (e.g., UE1, UE2) in close proximity communicate with each other, their data path (user plane) goes via the operator network. Thus a typical data path for the communication involves eNB(s) and/or Gateway(s) (GW(s)) (e.g., SGW/PGW).

Figure 7:
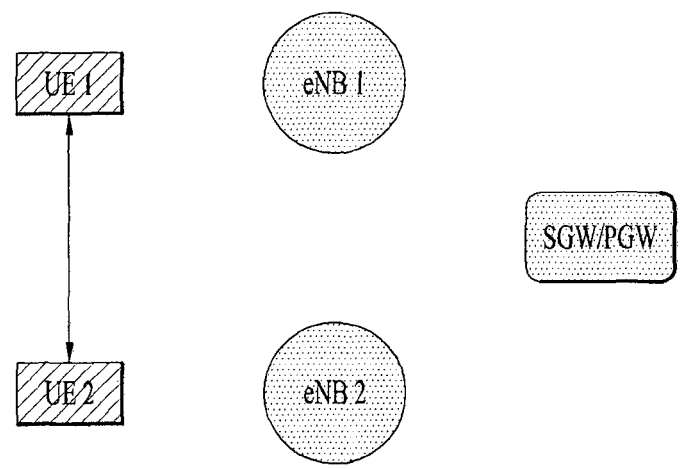
FIGS. 7~8 are examples of data path scenarios for a proximity communication.
Figure 8:
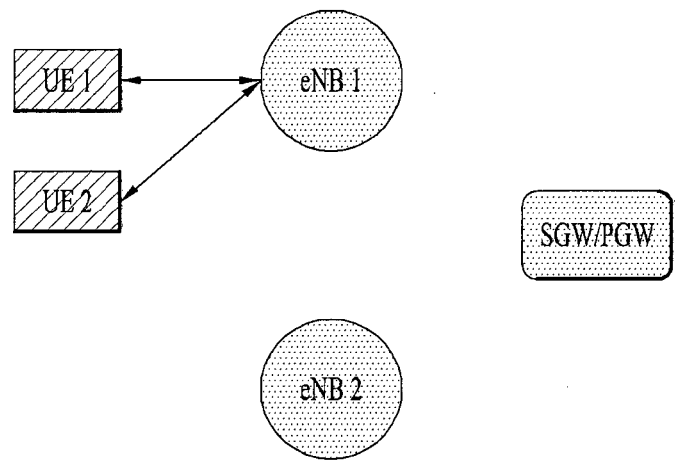

FIGS. 7~8 are examples of data path scenarios for a proximity communication. If wireless devices (e.g., UE1, UE2) are in proximity of each other, they may be able to use a direct mode data path (FIG. 7) or a locally routed data path (FIG. 8). In the direct mode data path, wireless devices are connected directly each other (after appropriate procedure(s), such as authentication), without eNB and SGW/PGW. In the locally routed data path, wireless devices are connected each other through eNB only.

Figure 9:
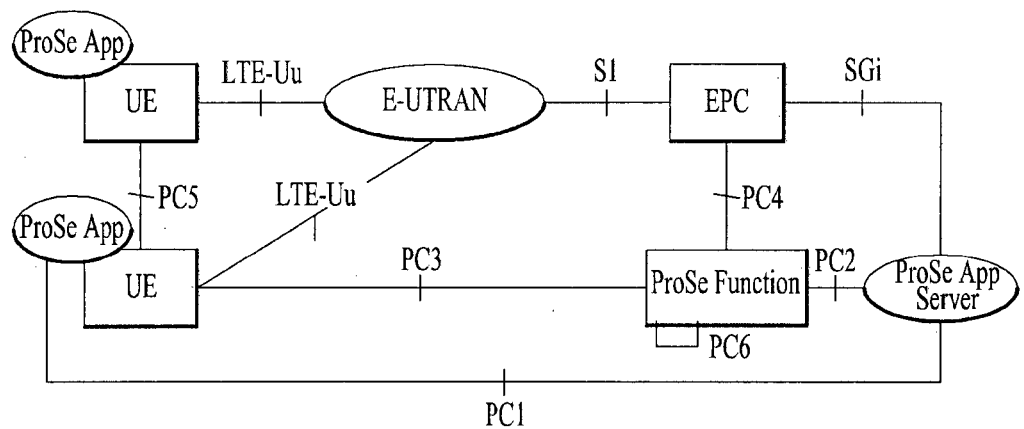
FIG. 9 is a conceptual diagram illustrating for a non-roaming reference architecture.

FIG. 9 is a conceptual diagram illustrating for a non-roaming reference architecture.

PC1~PC 5 represents interfaces. PC1 is a reference point between a ProSe application in a UE and a ProSe App server. It is used to define application level signalling requirements. PC 2 is a reference point between the ProSe App Server and the ProSe Function. It is used to define the interaction between ProSe App Server and ProSe functionality provided by the 3GPP EPS via ProSe Function. One example may be for application data updates for a ProSe database in the ProSe Function. Another example may be data for use by ProSe App Server in interworking between 3GPP functionality and application data, e.g. name translation. PC3 is a reference point between the UE and ProSe Function. It is used to define the interaction between UE and ProSe Function. An example may be to use for configuration for ProSe discovery and communication. PC4 is a reference point between the EPC and ProSe Function. It is used to define the interaction between EPC and ProSe Function. Possible use cases may be when setting up a one-to-one communication path between UEs or when validating ProSe services (authorization) for session management or mobility management in real time.

PC5 is a reference point between UE to UE used for control and user plane for discovery and communication, for relay and one-to-one communication (between UEs directly and between UEs over LTE-Uu). Lastly, PC6 is a reference point may be used for functions such as ProSe Discovery between users subscribed to different PLMNs.

EPC (Evolved Packet Core) includes entities such as MME, S-GW, P-GW, PCRF, HSS etc. The EPC here represents the E-UTRAN Core Network architecture. Interfaces inside the EPC may also be impacted albeit they are not explicitly shown in FIG. 9.

Application servers, which are users of the ProSe capability for building the application functionality, e.g. in the Public Safety cases they can be specific agencies (PSAP) or in the commercial cases social media. These applications are defined outside the 3GPP architecture but there may be reference points towards 3GPP entities. The Application server can communicate towards an application in the UE.

Applications in the UE use the ProSe capability for building the application functionality. Example may be for communication between members of Public Safety groups or for social media application that requests to find buddies in proximity. The ProSe Function in the network (as part of EPS) defined by 3GPP has a reference point towards the ProSe App Server, towards the EPC and the UE. The functionality may include but not restricted to e.g.:

Interworking via a reference point towards the 3rd party Applications

Authorization and configuration of the UE for discovery and Direct communication Enable the functionality of the EPC level ProSe discovery ProSe related new subscriber data and/handling of data storage; also handling of ProSe identities;

Security related functionality

Provide Control towards the EPC for policy related functionality

Provide functionality for charging (via or outside of EPC, e.g. offline charging)

Figure 10:
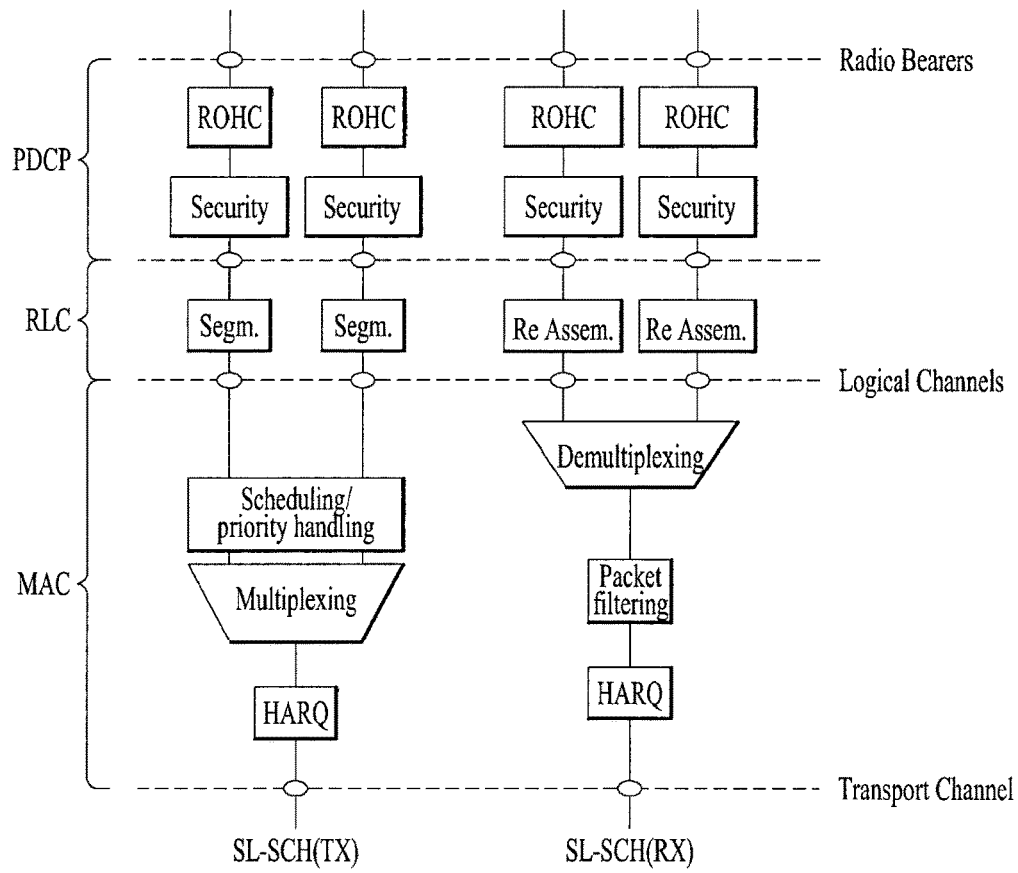
FIG. 10 is a conceptual diagram illustrating for a Layer 2 Structure for Sidelink.

FIG. 10 is a conceptual diagram illustrating for a Layer 2 structure for Sidelink.

The Sidelink is UE to UE interface for ProSe direct communication and ProSe Direct Discovery. Corresponds to the PC5 interface. The Sidelink comprises ProSe Direct Discovery and ProSe Direct Communication between UEs. The Sidelink uses uplink resources and physical channel structure similar to uplink transmissions. However, some changes, noted below, are made to the physical channels. E-UTRA defines two MAC entities; one in the UE and one in the E-UTRAN. These MAC entities handle the following transport channels additionally, i) sidelink broadcast channel (SL-BCH), ii) sidelink discovery channel (SL-DCH) and iii) sidelink shared channel (SL-SCH).

Basic Transmission Scheme:

the Sidelink transmission uses the same basic transmission scheme as the UL transmission scheme. However, sidelink is limited to single cluster transmissions for all the sidelink physical channels. Further, sidelink uses a 1 symbol gap at the end of each sidelink sub-frame.

Physical-Layer Processing:

the Sidelink physical layer processing of transport channels differs from UL transmission in the following steps:

i) Scrambling: for PSDCH and PSCCH, the scrambling is not UE-specific;

ii) Modulation: 64 QAM is not supported for Sidelink.

Physical Sidelink Control Channel:

PSCCH is mapped to the Sidelink control resources. PSCCH indicates resource and other transmission parameters used by a UE for PSSCH.

Sidelink Reference Signals:

for PSDCH, PSCCH and PSSCH demodulation, reference signals similar to uplink demodulation reference signals are transmitted in the 4th symbol of the slot in normal CP and in the 3rd symbol of the slot in extended cyclic prefix. The Sidelink demodulation reference signals sequence length equals the size (number of sub-carriers) of the assigned resource. For PSDCH and PSCCH, reference signals are created based on a fixed base sequence, cyclic shift and orthogonal cover code.

Physical Channel Procedure:

for in-coverage operation, the power spectral density of the sidelink transmissions can be influenced by the eNB.

Figure 11A:
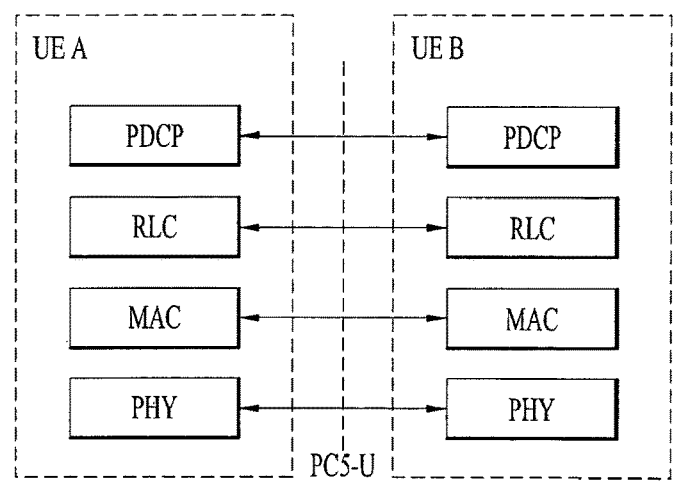
FIG. 11a is a conceptual diagram illustrating for User-Plane protocol stack for ProSe Direct Communication.
Figure 11B:
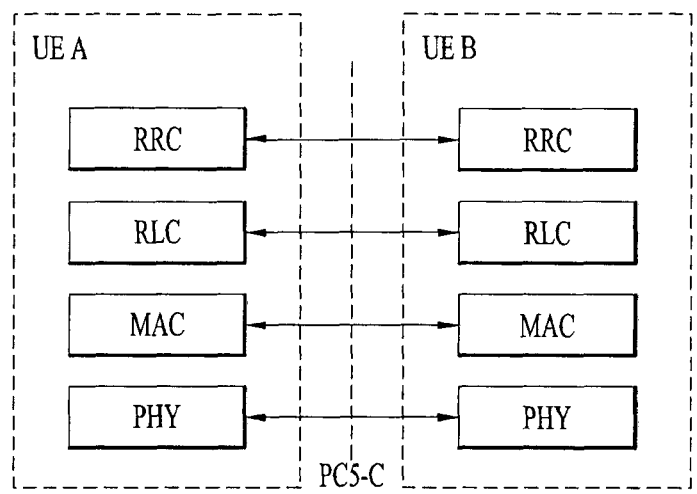
FIG. 11b is Control-Plane protocol stack for ProSe Direct Communication.

FIG. 11a is a conceptual diagram illustrating for User-Plane protocol stack for ProSe Direct Communication, and FIG. 11b is Control-Plane protocol stack for ProSe Direct Communication.

ProSe Direct Communication is a mode of communication whereby UEs can communicate with each other directly over the PC5 interface. This communication mode is supported when the UE is served by E-UTRAN and when the UE is outside of E-UTRA coverage. Only those UEs authorized to be used for public safety operation can perform ProSe Direct Communication.

In order to perform synchronization SBCCH carries the most essential system information needed to receive other ProSe channels and signals. The SBCCH along with synchronization signal is transmitted with a fixed periodicity of 40 ms. When the UE is in network coverage, the contents of SBCCH are derived from the parameters signalled by the eNB. When the UE is out of coverage, if the UE selects another UE as a synchronization reference, then the content of SBCCH is derived from the received SBCCH; otherwise UE uses pre-configured parameters. There is only one subframe every 40 ms for synchronization signal and SBCCH transmission for in-coverage operation. SIB18 provides the resource information for synchronization signal and SBCCH transmission. There are two pre-configured subframes every 40 ms for out of coverage operation. UE receives synchronization signal and SBCCH in one subframe and transmit synchronization signal and SBCCH on another subframe if UE becomes synchronization source based on defined criterion.

UE performs Prose Direct communication on subframes defined over the duration of Sidelink Control period. The Sidelink Control period is the period over which resources allocated in a cell for Sidelink Control and Sidelink Data transmissions occur. Within the Sidelink Control period the UE sends a Sidelink Control followed by data. Sidelink Control indicates a Layer 1 ID and characteristics of the transmissions (e.g. MCS, location of the resource(s) over the duration of Sidelink Control period, timing alignment).

The UE performs transmission and reception of Uu and PC5 with the following decreasing priority order:

Uu transmission/reception (highest priority);

PC5 ProSe Direct Communication transmission/reception;

PC5 ProSe Direct Discovery transmission/reception (lowest priority).

Figure 12:
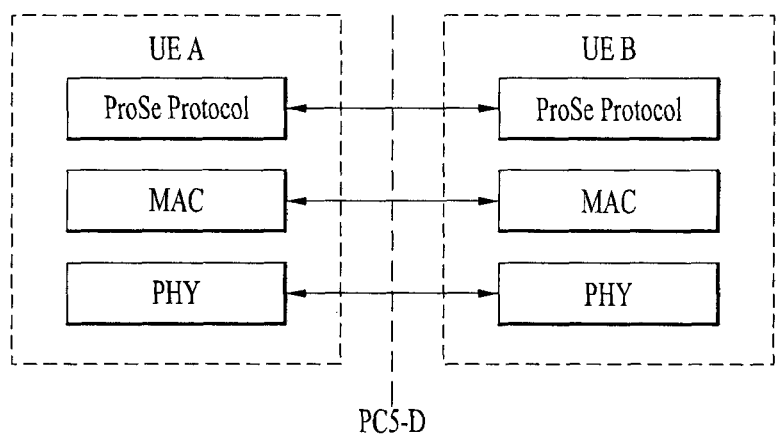
FIG. 12 is a conceptual diagram illustrating for a PC5 interface for ProSe Direct Discovery.

FIG. 12 is a conceptual diagram illustrating for a PC5 interface for ProSe Direct Discovery.

ProSe Direct Discovery is defined as the procedure used by the UE supporting Direct Discovery to discover other UE(s) in its proximity, using E-UTRA direct radio signals via PC5. ProSe Direct Discovery is supported only when the UE is served by E-UTRAN.

Upper layer handles authorization for announcement and monitoring of discovery message. Content of discovery message is transparent to Access Stratum (AS) and no distinction in AS is made for ProSe Direct Discovery models and types of ProSe Direct Discovery.

The UE can participate in announcing and monitoring of discovery message in both RRC_IDLE and RRC_CONNECTED states as per eNB configuration. The UE announces and monitors its discovery message subject to the half-duplex constraint.

The UE that participates in announcing and monitoring of discovery messages maintains the current UTC time. The UE that participates in announcing transmits the discovery message which is generated by the ProSe Protocol taking into account the UTC time upon transmission of the discovery message. In the monitoring UE the ProSe Protocol provides the message to be verified together with the UTC time upon reception of the message to the ProSe Function.

There are three range classes. Upper layer authorization provides applicable range class of the UE. Maximum allowed transmission power for each range class is signalled in SIB 19. The UE uses the applicable maximum allowed transmission power corresponding to its authorized range class. This puts an upper limit on the determined transmit power based on open loop power control parameters.

Figure 13A:
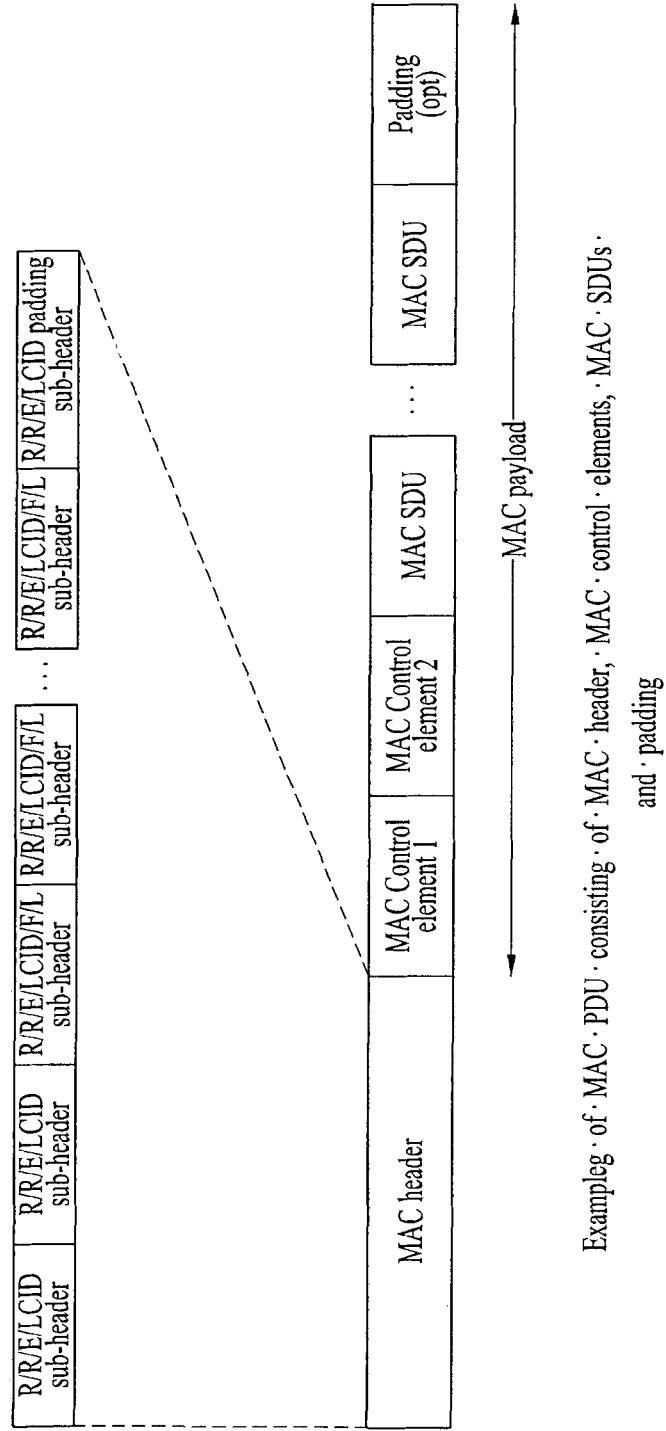
FIG. 13a~FIG. 13c are conceptual diagrams illustrating for a MAC PDU structure.
Figure 13B:
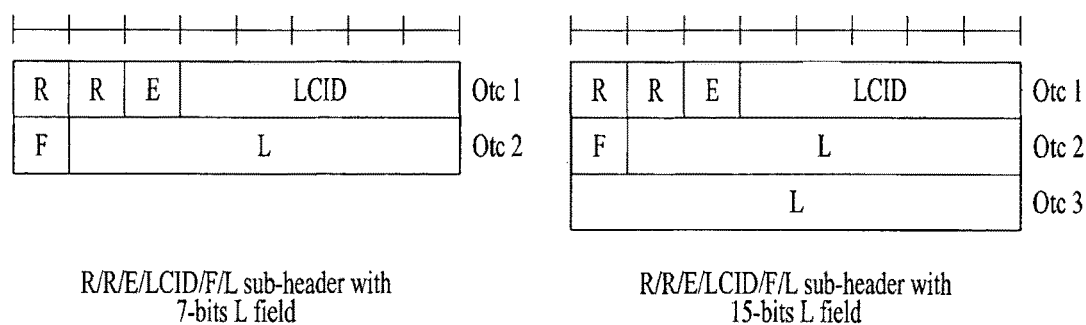
Figure 13C:
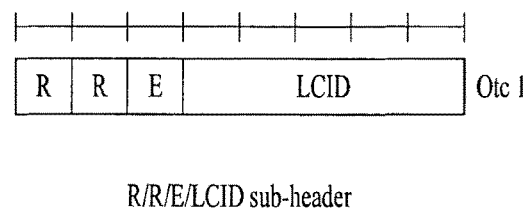

FIG. 13a~FIG. 13c are conceptual diagrams illustrating for a MAC PDU structure.

A MAC PDU consists of a MAC header, zero or more MAC Service Data Units (MAC SDU), zero, or more MAC control elements, and optionally padding; as described in FIG. 13a. Both the MAC header and the MAC SDUs are of variable sizes.

A MAC PDU header consists of one or more MAC PDU subheaders; each subheader corresponds to either a MAC SDU, a MAC control element or padding.

A MAC PDU subheader consists of the six header fields R/R/E/LCID/F/L but for the last subheader in the MAC PDU and for fixed sized MAC control elements. The last subheader in the MAC PDU and subheaders for fixed sized MAC control elements consist solely of the four header fields R/R/E/LCID. A MAC PDU subheader corresponding to padding consists of the four header fields R/R/E/LCID.

MAC PDU subheaders have the same order as the corresponding MAC SDUs, MAC control elements and padding. MAC control elements are always placed before any MAC SDU.

Padding occurs at the end of the MAC PDU, except when single-byte or two-byte padding is required. Padding may have any value and the UE shall ignore it. When padding is performed at the end of the MAC PDU, zero or more padding bytes are allowed.

When single-byte or two-byte padding is required, one or two MAC PDU subheaders corresponding to padding are placed at the beginning of the MAC PDU before any other MAC PDU subheader. A maximum of one MAC PDU can be transmitted per TB per UE. A maximum of one MCH MAC PDU can be transmitted per TTI.

The MAC header is of variable size and consists of the following fields:

1) LCID: The Logical Channel ID field identifies the logical channel instance of the corresponding MAC SDU or the type of the corresponding MAC control element or padding as described in Tables 1, Table 2 and Table 3 for the DL-SCH, UL-SCH and MCH respectively. There is one LCID field for each MAC SDU, MAC control element or padding included in the MAC PDU. In addition to that, one or two additional LCID fields are included in the MAC PDU, when single-byte or two-byte padding is required but cannot be achieved by padding at the end of the MAC PDU. The LCID field size is 5 bits.

TABLE 1

Values of LCID for DL-SCH

| Index | LCID values |
|---|---|
| 00000 | CCCH |
| 00001-01010 | Identity of the logical channel |
| 01011-11010 | Reserved |
| 11011 | Activation/Deactivation |
| 11100 | UE Contention Resolution Identity |

TABLE 1-continued

Values of LCID for DL-SCH

| Index | LCID values |
| --- | --- |
| 11101 | Timing Advance Command |
| 11110 | DRX Command |
| 11111 | Padding |

TABLE 2

Values of LCID for UL-SCH

| Index | LCID values |
| --- | --- |
| 00000 | CCCH |
| 00001-01010 | Identity of the logical channel |
| 01011-11000 | Reserved |
| 11001 | Extended Power Headroom Report |
| 11010 | Power Headroom Report |
| 11011 | C-RNTI |
| 11100 | Truncated BSR |
| 11101 | Short BSR |
| 11110 | Long BSR |
| 11111 | Padding |

TABLE 3

Values of LCID for MCH

| Index | LCID values |
| --- | --- |
| 00000 | MCCH (see note) |
| 00001-11100 | MTCH |
| 11101 | Reserved |
| 11110 | MCH Scheduling Information |
| 11111 | Padding |

NOTE:
If there is no MCCH on MCH, an MTCH could use this value.

2) L: The Length field indicates the length of the corresponding MAC SDU or variable-sized MAC control element in bytes. There is one L field per MAC PDU subheader except for the last subheader and subheaders corresponding to fixed-sized MAC control elements. The size of the L field is indicated by the F field.

3) F: The Format field indicates the size of the Length field as indicated in Table 4. There is one F field per MAC PDU subheader except for the last subheader and subheaders corresponding to fixed-sized MAC control elements. The size of the F field is 1 bit. If the size of the MAC SDU or variable-sized MAC control element is less than 128 bytes, the value of the F field is set to 0, otherwise it is set to 1.

TABLE 4

Values of F field

| Index | Size of Length field (in bits) |
| --- | --- |
| 0 | 7 |
| 1 | 15 |

4) E: The Extension field is a flag indicating if more fields are present in the MAC header or not. The E field is set to "1" to indicate another set of at least R/R/E/LCID fields. The E field is set to "0" to indicate that either a MAC SDU, a MAC control element or padding starts at the next byte.

5) R: Reserved bit, set to "0".

In the legacy system, the Logical Channel ID (LCID) is used to identify the logical channel instance of the corresponding MAC SDU or the type of the corresponding MAC control element or padding. There is one LCID field for each MAC SDU, MAC control element or padding included in the MAC PDU. The Logical Channel ID is allocated for each logical channel when the Radio Bearer is setup. Currently, there are 8 values available for data radio bearer (3 to 10).

To communicate between a first UE and a second UE, the UE must know other UE's D2D-ID before executing D2D communication. These D2D-IDs are either provided by higher layer or generated by a source UE itself. If the D2D-ID is self-generated by each UE, so there should be some methods defined for notifying self-generated D2D-IDs to other UEs.

Figure 14:
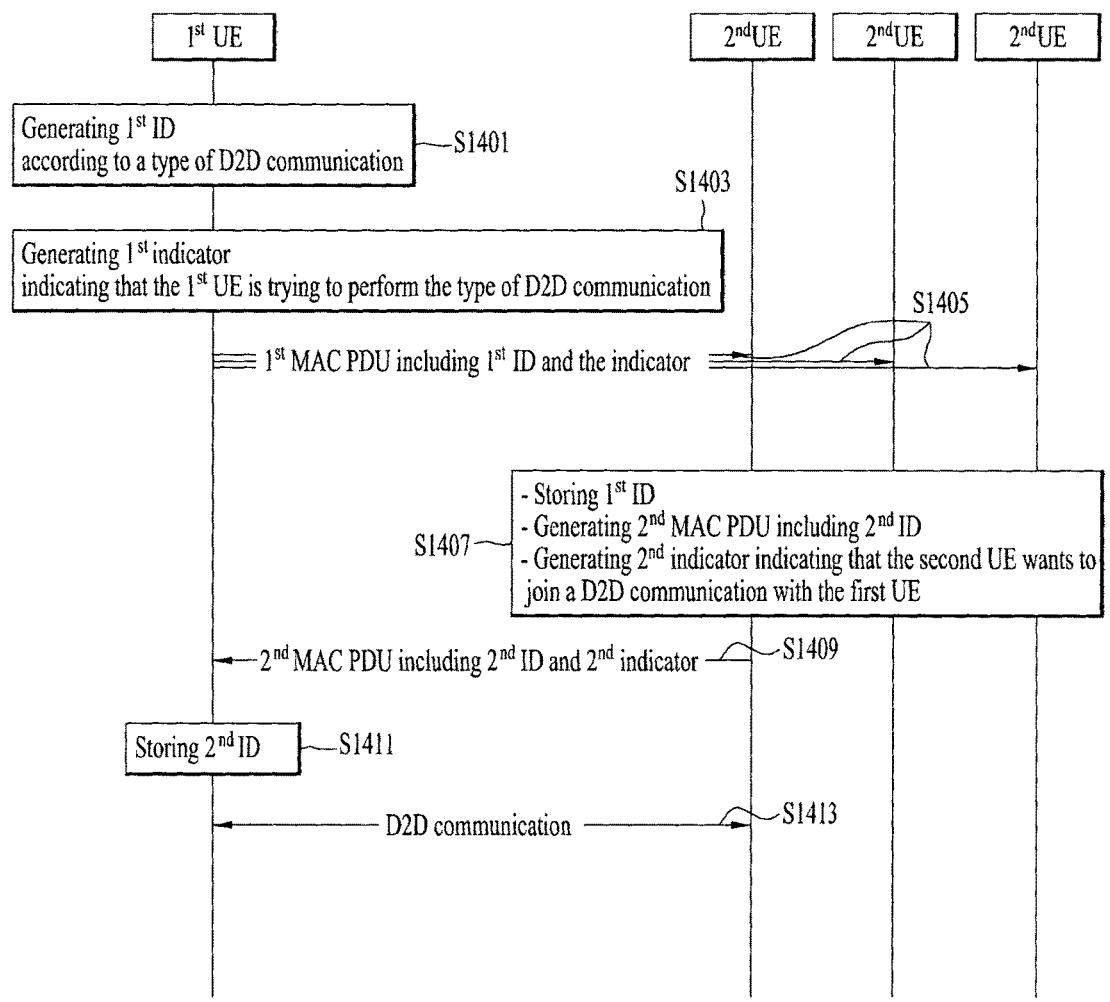
FIG. 14 is a conceptual diagram for notifying D2D-ID for D2D communication according to embodiments of the present invention.

FIG. 14 is a conceptual diagram for notifying D2D-ID for D2D communication according to embodiments of the present invention.

If a first UE wants to try D2D communication with a second UE or a group of UEs including the second UE directly, a first UE generates a first MAC PDU (Medium Access Control Protocol Data Unit) including a first ID according to a type of D2D (Device to Device) communication (S1401).

Preferably, the type of D2D communication comprises 1-to-1, 1-to-M, or Broadcast communication.

There are different types of D2D-ID: if the type of D2D communication is a 1 to 1 communication, the first ID is an ID of the first UE, if the type of D2D communication is a 1 to M (M>1) communication, the first ID is an ID that identifies a specific UE group, and if the type of D2D communication is a broadcast communication, the first ID is an ID that identifies a specific broadcasting.

Preferably, the first MAC PDU further comprises a LCID field indicating the type of D2D communication. The LCID can be used to indicate the purpose of MAC PDU. One LCID value is allocated per D2D purpose.

The first UE generates a first indicator indicating that the first UE is trying to perform the type of D2D communication with at least one second UE (S1403). And the first UE transmits a first MAC PDU (Medium Access Control Protocol Data Unit) including the first ID and the first indicator to that at least one second UE (S1405).

If the type of D2D communication is a 1 to 1 communication, the first indicator indicates that the first UE (or sender UE) is looking for a second UE (or receiver UE) who wants to join the 1-to-1 communication with the sender UE. The first MAC PDU is sent by a sender UE who wants to start 1-to-1 communication. The first MAC PDU includes the first UE of the sender UE.

After a step of S1405, when a second UE receives the first MAC PDU including the first indicator and the first ID (e.g. an ID of the first UE: UE-ID1) over D2D resource, the second UE checks whether it wants to execute 1-to-1 communication with the first UE identified by the first ID. If the second UE decides to execute 1-to-1 communication with the first UE, the second UE stores the received UE-ID1, and generates a second MAC PDU including a Joining 1-to-1 communication indicator, the UE-ID1, and a second ID that an ID of the second UE (UE-ID2) (S1407). The Joining 1-to-1 communication indicator indicates that the second UE wants to join the 1-to-1 communication with the first UE. The second UE then sends the second MAC PDU to the first UE over D2D resource (S1409).

When the first UE receives the second MAC PDU including the Joining 1-to-1 communication indicator, the UE-ID1, and the UE-ID2, the first UE considers that 1-to-1 communication channel is established with the second UE having UE-ID2, and stores the received UE-ID2 (S1411). The first UE then starts 1-to-1 communication with the second UE (S1413).

If the type of D2D communication is a 1 to M (M>1) communication, the first indicator indicates that the sender UE is looking for a receiver UE who wants to join the D2D Group for 1-to-M communication. The first MAC PDU is sent by a sender UE who wants to start 1-to-M communication. The first MAC PDU includes the Group-ID of the D2D Group.

When a first UE wants to start 1-to-M communication with multiple second UEs, the first UE generates a first MAC PDU including a first indicator for a D2D group and the first ID (e.g., an ID that identifies a specific UE group). The first indicator indicates that the sender UE is looking for a receiver UE who wants to join the D2D Group for 1-to-M communication. The first UE then sends the first MAC PDU over D2D resource (S1405).

When a second UE receives the first MAC PDU including the first indicator and the ID that identifies a specific UE group over D2D resource, the second UE checks whether it wants to join the D2D Group identified by the Group-ID. If the second UE decides to join the D2D Group identified by the Group-ID, the second UE stores the Group-ID as a member of the D2D Group, and generates a second MAC PDU including a Joining 1-to-M communication indicator, the a ID of the second UE (UE-ID2) (S1407). The Joining 1-to-M communication indicator indicates that the sender UE wants to join the D2D Group identified by the Group-ID. The second UE then sends the second MAC PDU over D2D resource (S1409).

Preferably, the first MAC PDU further comprises an ID of the first UE. In this case, the second UE can store the ID of the first UE as a member of the D2D Group, and generates a second MAC PDU including the ID of the first UE optionally.

When a first UE who is the member of the D2D Group receives the second MAC PDU including the Joining 1-to-M communication indicator, the UE-ID2, and optionally the UE-ID1, the UE considers that 1-to-M communication channel is established with the second UE having UE-ID2, and stores the received UE-ID2 as a member of the D2D Group (S1411). The first UE then starts 1-to-M communication including the second UE (S1413).

If the type of D2D communication is a broadcast communication, the first indicator indicates that the sender UE sends Broadcasting packet. The first MAC PDU is sent by a sender UE who wants to start Broadcast communication. The first MAC PDU includes the Broadcast-ID of the Broadcasting session.

When a first UE wants to start Broadcast communication to any second UE, the first UE generates a first MAC PDU including a Broadcast-ID Notification indicator and optionally the UE-ID1 (S1403). The Broadcast-ID Notification indicator indicates that the sender UE sends Broadcasting packet. When a second UE receives the first MAC PDU including the Broadcast-ID and optionally the UE-ID1 over D2D resource (S1405), the second UE checks whether it wants to receive Broadcasting packets from the first UE identified by the UE-ID1. If the second UE decides to receive Broadcasting packets from the UE1 identified by the UE-ID1, the UE2 stores the received Broadcast-ID and the received UE-ID1 (S1407).

Preferably, the UE who wants to perform D2D-ID notification can transmit the MAC PDU including its D2D-ID periodically over the D2D resource. The UE who wants to join the D2D communication can monitor D2D resource periodically to receive a MAC PDU including the D2D-ID.

FIGS. 15a~15d are conceptual diagrams for notifying joining or leaving D2D communication according to embodiments of the present invention.

Figure 15A:
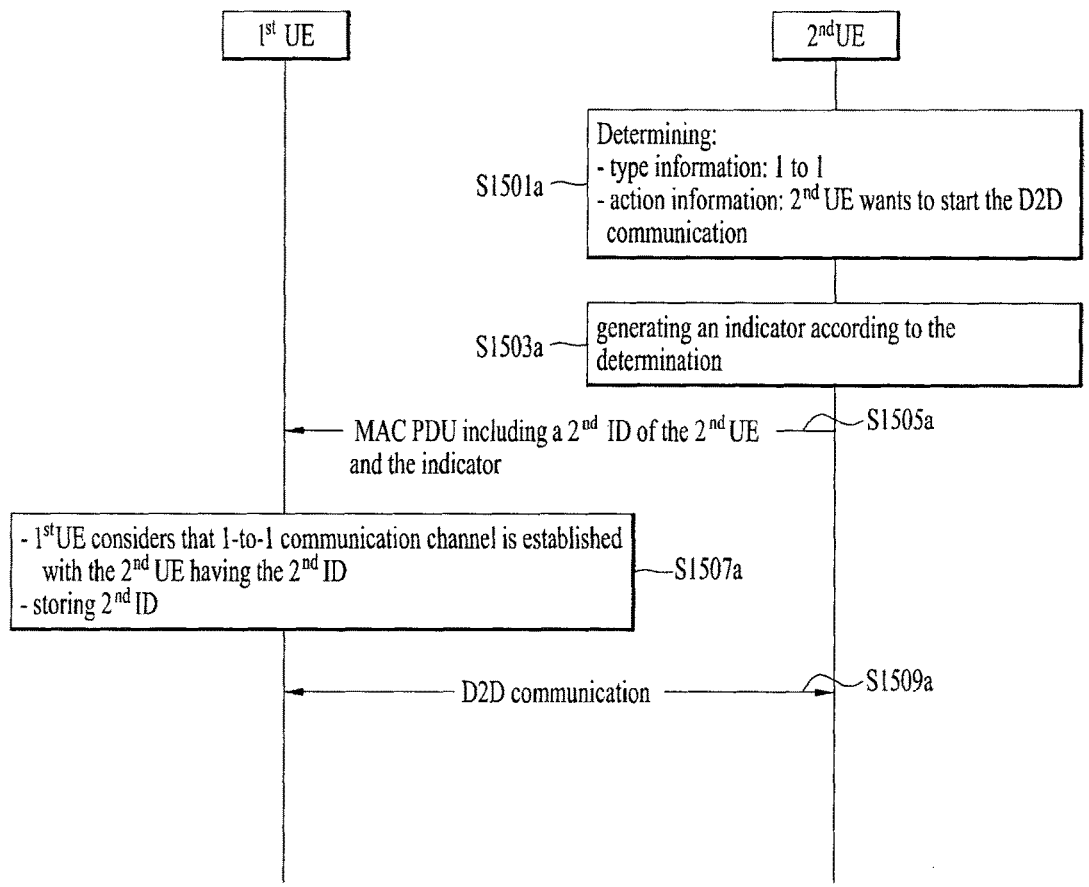
FIGS. 15a~15d are conceptual diagrams for notifying joining or leaving D2D communication according to embodiments of the present invention.

FIG. 15a is a conceptual diagram for notifying joining 1 to 1 D2D communication according to embodiments of the present invention.

The one of second UEs determines type information and action information for a D2D communication with a first UE.

The type information includes which the D2D communication is an 1 to 1 communication or an 1 to M (M>1) communication.

The action information includes which the first UE wants to start or stop the D2D communication with the first UE.

If the one of second UEs determines that the type of information is an 1 to 1 communication and the action information is starting the D2D communication with a first UE (S1501a), the second UE generates an indicator according to the determination (S1503a).

Preferably, the indicator is a Joining 1-to-1 communication indicator. The Joining 1-to-1 communication indicator indicates that the second UE wants to join the 1-to-1 communication with the first UE.

The second UE transmits a MAC PDU including an ID of the second UE and the indicator to the first UE (S1505a).

When the first UE receives the second MAC PDU including the Joining 1-to-1 communication indicator, and the ID of the second UE, the first UE considers that 1-to-1 communication channel is established with the second UE having ID of the second UE, and stores the received ID of the second UE (S1507a). The first UE then starts 1-to-1 communication with the second UE (S1509a).

Figure 15B:
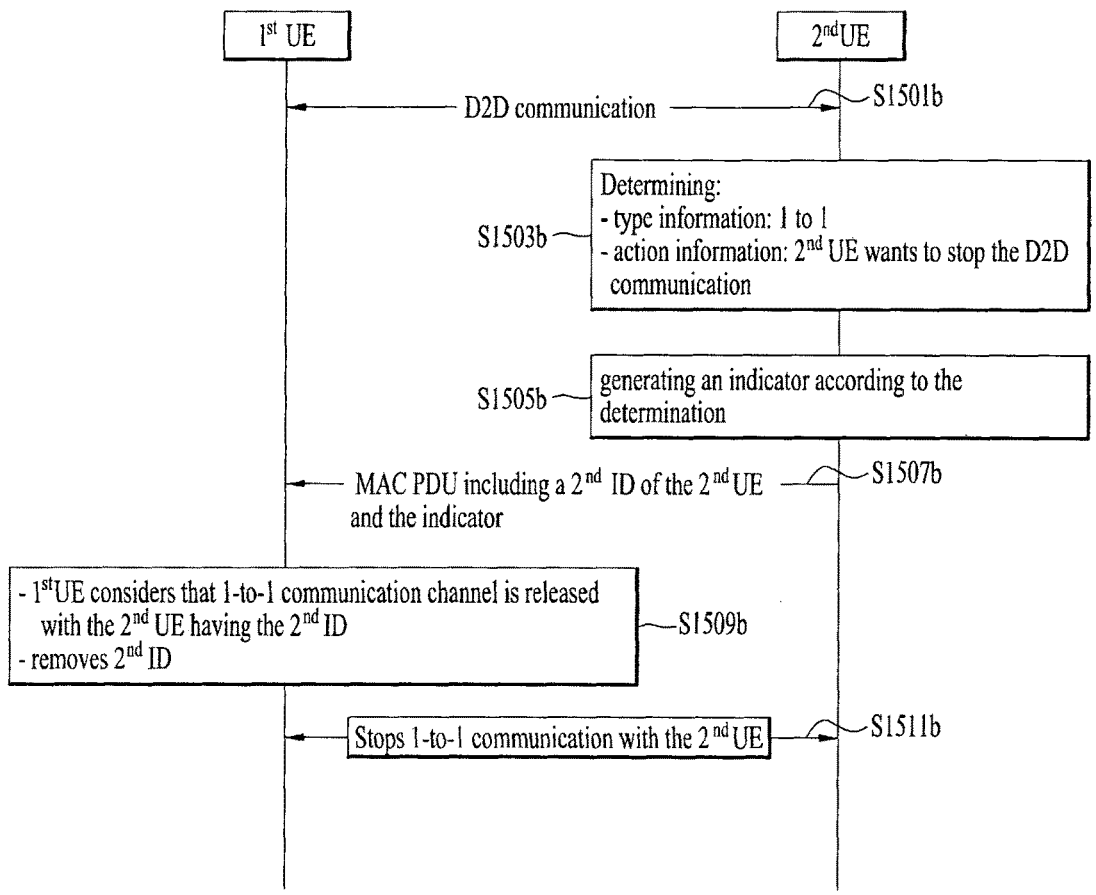

FIG. 15b is a conceptual diagram for notifying leaving 1 to 1 D2D communication according to embodiments of the present invention.

The one of second UEs are communicating with at least one first UE (S1501b)

If the one of second UEs determines that the type of information is an 1 to 1 communication and the action information is stopping the D2D communication with a first UE (S1503b), the second UE generates an indicator according to the determination (S1505b).

Preferably, the indicator is a Leaving 1-to-1 communication indicator. The Leaving 1-to-1 communication indicator indicates that the second UE wants to leave the 1-to-1 communication with the first UE.

The second UE transmits a MAC PDU including an ID of the second UE and the indicator to the first UE (S1507b).

When the first UE receives the second MAC PDU including the Leaving 1-to-1 communication indicator, and the ID of the second UE, the first UE considers that 1-to-1 communication channel is released with the second UE having ID of the second UE, and removes the received ID of the second UE (S1509b). The first UE then stops 1-to-1 communication with the second UE (S1511b).

Figure 15C:
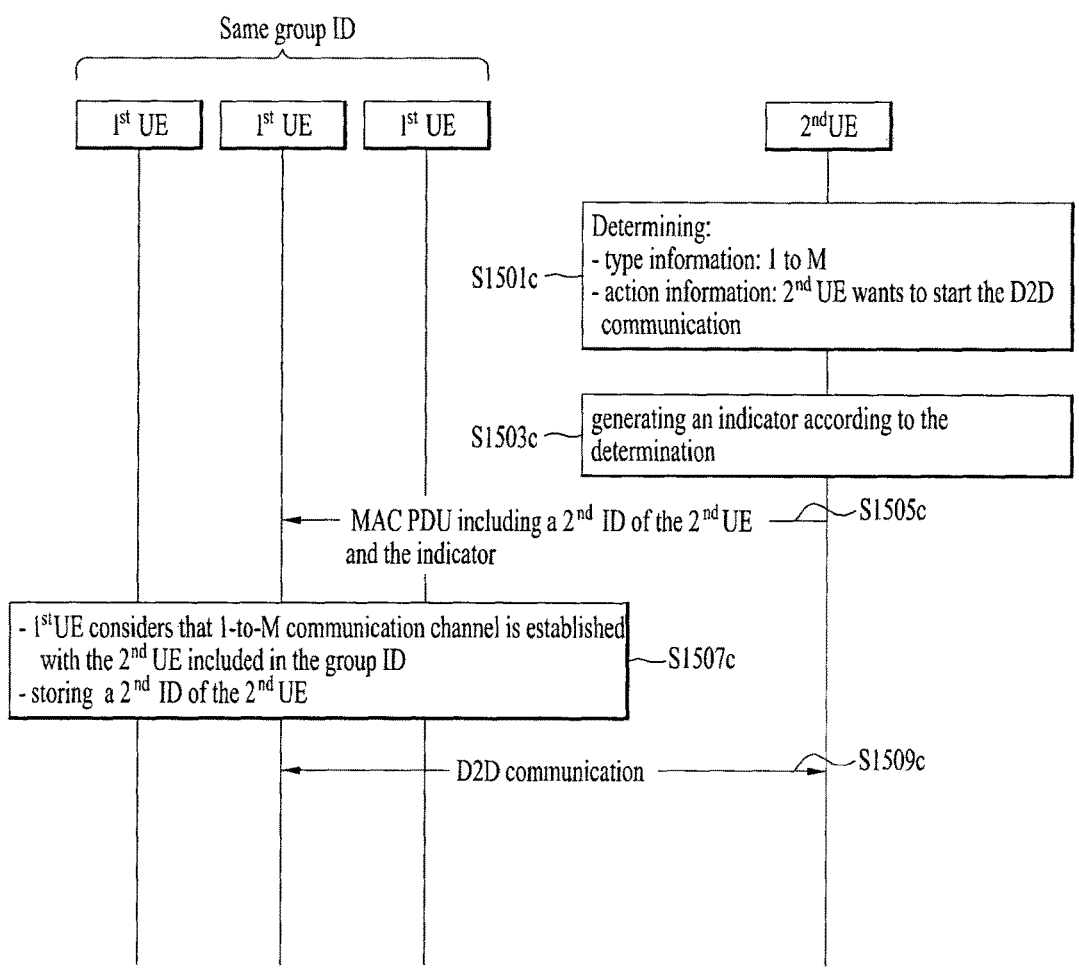

FIG. 15c is a conceptual diagram for notifying joining 1 to M D2D communication according to embodiments of the present invention.

If the one of second UEs determines that the type of information is an 1 to M communication and the action information is starting the D2D communication with a first UE (S1501c), the second UE generates an indicator according to the determination (S1503c).

Preferably, the indicator is a Joining 1-to-M communication indicator. The Joining 1-to-M communication indicator indicates that the second UE wants to join the D2D Group. The D2D Group is identified by a D2D group ID. The D2D group ID can be received from the first UE though a MAC PDU.

The second UE transmits a MAC PDU including an ID of the second UE and the indicator to the first UE (S1505c).

When a first UE who is the member of the D2D Group receives the second MAC PDU including the Joining 1-to-M communication indicator and an ID of the second UE, the UE considers that 1-to-M communication channel is established with the second UE having the ID of the second UE, and stores the received the ID of the second UE as a member of the D2D Group (S1507c). The first UE then starts 1-to-M communication including the second UE (S1509c).

Figure 15D:
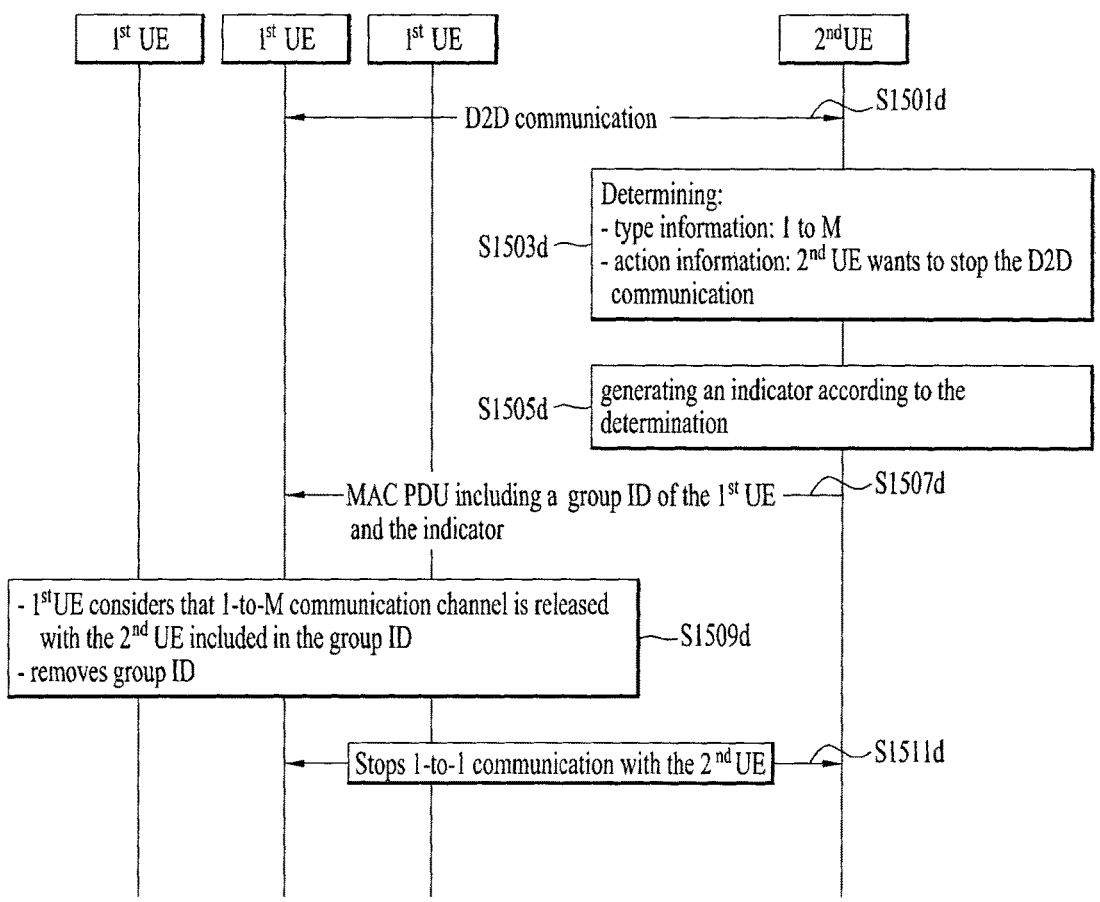

FIG. 15d is a conceptual diagram for notifying leaving 1 to M D2D communication according to embodiments of the present invention.

A second UE is communicating with at least one first UE (S1501d)

If the second UE determines that the type of information is an 1 to 1 communication and the action information is stopping the D2D communication with D2D group including the first UE (S1503d), the second UE generates an indicator according to the determination (S1505d).

Preferably, the indicator is a Leaving 1-to-M communication indicator. The Leaving 1-to-1 communication indicator indicates that the sender UE wants to leave the D2D Group identified by the Group-ID.

The second UE transmits a MAC PDU including an ID of the second UE and the indicator to the at least one first UE (S1507d).

When the first UE receives the second MAC PDU including the Leaving 1-to-M communication indicator, and the ID of the second UE, the first UE considers that 1-to-1 communication channel is released with the second UE having ID of the second UE, and removes the received ID of the second UE (S1509d). The first UE then stops 1-to-1 communication with the second UE (S1511d).

INDUSTRIAL APPLICABILITY

While the above-described method has been described centering on an example applied to the 3GPP LTE system, the present invention is applicable to a variety of wireless communication systems in addition to the 3GPP LTE system.

The invention claimed is:

1. A method for a first user equipment (UE) operating in a wireless communication system, the method comprising:
generating, by the first UE, a Medium Access Control (MAC) Protocol Data Unit (PDU) including a first identity (ID) identifying the first UE and a second ID, and a plurality of logical channel IDs (LCIDs) and a plurality of MAC Service Data Units (SDUs) to be transmitted to a second UE; and
transmitting, by the first UE to the second UE, the generated MAC PDU via a direct interface configured between the first UE and the second UE directly,
wherein if the MAC PDU is for one-to-one communication, the second ID identifies the second UE and the MAC PDU includes an indicator indicating that the MAC PDU is for one-to-one communication,
wherein if the MAC PDU is for one-to-many communication, the second ID identifying a group to which the second UE belongs and the MAC PDU includes an indicator indicating that the MAC PDU is for one-to-many communication, and
wherein each MAC SDU of the plurality of MAC SDUs respectively corresponds to one LCID of the plurality of LCIDs.

2. The method according to claim 1, wherein the indicator is a joining one-to-one communication indicator indicating that the second UE wants to join device-to-device (D2D) communication with the first UE if the MAC PDU is for one-to-one communication.

3. The method according to claim 1, wherein the indicator is a joining one-to-many communication indicator indicating that the second UE wants to join device-to-device (D2D) communication with the group identified by the second ID if the MAC PDU is for one-to-many communication.

4. The method according to claim 1, wherein the MAC PDU further includes a third ID identifying the second UE if the MAC PDU is for one-to-many communication.

5. A first User Equipment (UE) for operating in a wireless communication system, the first UE comprising:
a Radio Frequency (RF) module; and
a processor configured to:
generate a Medium Access Control (MAC) Protocol Data Unit (PDU) including a first identity (ID) identifying the first UE and a second ID, and a plurality of logical channel IDs (LCID) and a plurality of MAC Service Data Units (SDUs) to be transmitted to a second UE, and
control the RF unit to transmit the generated MAC PDU to the second UE via a direct interface configured between the first UE and the second UE directly,
wherein if the MAC PDU is for one-to-one communication, the second ID identifies the second UE and the MAC PDU includes an indicator indicating that the MAC PDU is for one-to-one communication,
wherein if the MAC PDU is for one-to-many communication, the second ID identifying a group to which the second UE belongs and the MAC PDU includes an indicator indicating that the MAC PDU is for one-to-many communication, and
wherein each MAC SDU of the plurality of MAC SDUs respectively corresponds to one LCID of the plurality of LCIDs.

6. The first UE according to claim 5, wherein the indicator is a joining one-to-one communication indicator indicating that the second UE wants to join device-to-device (D2D) communication with the first UE if the MAC PDU is for one-to-one communication.

7. The first UE according to claim 5, wherein the indicator is a joining one-to-many communication indicator indicating that the second UE wants to join device-to-device (D2D) communication with the group identified by the second ID if the MAC PDU is for one-to-many communication.

8. The first UE according to claim 5, wherein the MAC PDU further includes a third ID identifying the second UE if the MAC PDU is for one-to-many communication.

* * * * *